US008819825B2

(12) United States Patent
Keromytis et al.

(10) Patent No.: US 8,819,825 B2
(45) Date of Patent: Aug. 26, 2014

(54) SYSTEMS, METHODS, AND MEDIA FOR GENERATING BAIT INFORMATION FOR TRAP-BASED DEFENSES

(75) Inventors: Angelos D. Keromytis, New York, NY (US); Salvatore J. Stolfo, Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 950 days.

(21) Appl. No.: 12/302,774

(22) PCT Filed: May 31, 2007

(86) PCT No.: PCT/US2007/012811
§ 371 (c)(1),
(2), (4) Date: May 27, 2009

(87) PCT Pub. No.: WO2007/143011
PCT Pub. Date: Dec. 13, 2007

(65) Prior Publication Data
US 2009/0241191 A1 Sep. 24, 2009

Related U.S. Application Data

(60) Provisional application No. 60/809,898, filed on May 31, 2006.

(51) Int. Cl.
*G06F 21/00* (2013.01)
(52) U.S. Cl.
USPC .......... 726/24; 726/1; 726/23; 713/188; 709/205; 709/206

(58) Field of Classification Search
USPC ...................................... 726/23–24
See application file for complete search history.

(56) References Cited

U.S. PATENT DOCUMENTS

| | | | |
|---|---|---|---|
| 5,440,723 A | 8/1995 | Arnold et al. | |
| 5,621,889 A | 4/1997 | Lermuzeaux et al. | |
| 5,796,952 A | 8/1998 | Davis et al. | |
| 5,987,611 A * | 11/1999 | Freund | 726/4 |
| 5,991,714 A | 11/1999 | Shaner | |
| 6,108,799 A * | 8/2000 | Boulay et al. | 714/38.13 |
| 6,405,318 B1 | 6/2002 | Rowland | |
| 6,408,391 B1 | 6/2002 | Huff et al. | |
| 6,671,811 B1 * | 12/2003 | Diep et al. | 726/23 |
| 6,687,833 B1 | 2/2004 | Osborne et al. | |

(Continued)

FOREIGN PATENT DOCUMENTS

WO  WO/2008/041915  4/2008

OTHER PUBLICATIONS

Cheswick, "An Evening with Berferd in Which a Cracker is Lured, Endured, and Studied", AT&T Bell Laboratories, www.cheswick.com/ches/papers/berferd.pdf, Jan. 7, 1991.*

(Continued)

*Primary Examiner* — Morshed Mehedi
(74) *Attorney, Agent, or Firm* — Byrne Poh LLP

(57) ABSTRACT

Systems, methods, and media for generating bait information for trap-based defenses are provided. In some embodiments, methods for generating bait information for trap-based defenses include: recording historical information of a network; translating the historical information; and generating bait information by tailoring the translated historical information.

24 Claims, 2 Drawing Sheets

(56) References Cited

U.S. PATENT DOCUMENTS

| | | | |
|---|---|---|---|
| 6,963,983 | B2 | 11/2005 | Munson et al. |
| 7,093,291 | B2 | 8/2006 | Bailey |
| 7,152,242 | B2 * | 12/2006 | Douglas .......................... 726/23 |
| 7,155,509 | B1 * | 12/2006 | Cordsmeyer et al. ......... 709/224 |
| 7,355,600 | B2 | 4/2008 | Baraff et al. |
| 7,428,484 | B2 | 9/2008 | Yun et al. |
| 7,463,265 | B2 | 12/2008 | Styles |
| 7,464,407 | B2 | 12/2008 | Nakae et al. |
| 7,464,408 | B1 * | 12/2008 | Shah et al. ....................... 726/22 |
| 7,475,405 | B2 | 1/2009 | Manganaris et al. |
| 7,545,379 | B2 | 6/2009 | Xie et al. |
| 7,603,709 | B2 | 10/2009 | Lewis et al. |
| 7,630,986 | B1 * | 12/2009 | Herz et al. ............................ 1/1 |
| 7,636,944 | B2 | 12/2009 | Raikar |
| 7,673,147 | B2 | 3/2010 | Moghe et al. |
| 7,716,181 | B2 * | 5/2010 | Todd ............................. 707/635 |
| 7,788,071 | B2 | 8/2010 | Bond et al. |
| 7,908,652 | B1 * | 3/2011 | Austin et al. .................... 726/22 |
| 2002/0035696 | A1 * | 3/2002 | Thacker ........................ 713/200 |
| 2002/0066034 | A1 * | 5/2002 | Schlossberg et al. .......... 713/201 |
| 2002/0116635 | A1 * | 8/2002 | Sheymov ...................... 713/200 |
| 2002/0184528 | A1 * | 12/2002 | Shevenell et al. ............. 713/201 |
| 2002/0197978 | A1 | 12/2002 | Zavidniak |
| 2003/0149744 | A1 * | 8/2003 | Bierre et al. .................. 709/217 |
| 2004/0049693 | A1 * | 3/2004 | Douglas ........................ 713/200 |
| 2004/0111632 | A1 | 6/2004 | Halperin |
| 2004/0148521 | A1 | 7/2004 | Cohen et al. |
| 2004/0260733 | A1 | 12/2004 | Adelstein et al. |
| 2005/0071643 | A1 | 3/2005 | Moghe |
| 2005/0071684 | A1 * | 3/2005 | Sorkin et al. .................. 713/201 |
| 2005/0172115 | A1 | 8/2005 | Bodorin et al. |
| 2005/0188272 | A1 | 8/2005 | Bodorin et al. |
| 2005/0265331 | A1 | 12/2005 | Stolfo et al. |
| 2005/0281291 | A1 | 12/2005 | Stolfo et al. |
| 2006/0015630 | A1 | 1/2006 | Stolfo et al. |
| 2006/0031935 | A1 * | 2/2006 | Lyle et al. ....................... 726/22 |
| 2006/0085854 | A1 | 4/2006 | Agrawal et al. |
| 2006/0123083 | A1 * | 6/2006 | Goutte et al. .................. 709/206 |
| 2006/0242694 | A1 * | 10/2006 | Gold et al. ....................... 726/13 |
| 2006/0265750 | A1 * | 11/2006 | Huddleston ..................... 726/24 |
| 2007/0101430 | A1 * | 5/2007 | Raikar ............................. 726/24 |
| 2007/0157289 | A1 | 7/2007 | Newton et al. |
| 2007/0250930 | A1 | 10/2007 | Aziz et al. |
| 2007/0271614 | A1 | 11/2007 | Capalik |
| 2007/0283434 | A1 | 12/2007 | Cohen et al. |
| 2007/0283435 | A1 | 12/2007 | Cohen et al. |
| 2007/0291043 | A1 | 12/2007 | Bruderlin et al. |
| 2008/0022400 | A1 | 1/2008 | Cohen et al. |
| 2009/0007270 | A1 | 1/2009 | Futoransky et al. |
| 2009/0028135 | A1 | 1/2009 | Mantripragada et al. |
| 2009/0044042 | A1 * | 2/2009 | Fujiwara et al. .................. 714/3 |
| 2009/0083855 | A1 | 3/2009 | Apap et al. |
| 2009/0227281 | A1 | 9/2009 | Hammad et al. |
| 2009/0292696 | A1 | 11/2009 | Shuster |
| 2009/0293121 | A1 | 11/2009 | Bigus et al. |
| 2010/0064370 | A1 | 3/2010 | Thiebeauld de la Crouee et al. |
| 2010/0077483 | A1 | 3/2010 | Stolfo et al. |
| 2010/0269175 | A1 | 10/2010 | Stolfo et al. |
| 2011/0010470 | A1 | 1/2011 | Hulbert et al. |
| 2011/0093630 | A1 | 4/2011 | Arnholt, Jr. et al. |
| 2011/0167493 | A1 | 7/2011 | Song et al. |

OTHER PUBLICATIONS

Abou-Assaleh, T., et al., "Detection of New Malicious Code Using N-grams Signatures", In Proceedings of Second Annual Conference on Privacy, Security and Trust, Oct. 13-15, 2004, pp. 193-196.

Abou-Assaleh, T., et al., "N-Gram-Based Detection of New Malicious Code", In Proceedings of the 28th IEEE Annual International Computer Software and Applications Conference (COMPSAC 2004), Hong Kong, Sep. 28-30, 2004.

Aha, D.W., et al., "Instance-Based Learning Algorithms", In Machine Learning, vol. 6, No. 1, 1991, pp. 37-66.

Akritidis, P., et al., "Proximity Breeds Danger: Emerging Threats in Metro-Area Wireless Networks", In Proceedings of the 16th USENIX Security Symposium, Aug. 2007, pp. 323-338.

Arbaugh, W.A., "Chaining Layered Integrity Checks", PhD thesis, University of Pennsylvania, 1999, pp. 1-118.

Arbaugh, W.A., et al., "A Secure and Reliable Bootstrap Architecture", In IEEE Security and Privacy Conference, May 1997, pp. 65-71.

Bailey, M., et al., "The Blaster Worm: Then and Now", In IEEE Security & Privacy, vol. 3, No. 4, Jul./Aug. 2005, pp. 26-31.

Barham, P., et al., "Xen and the Art of Virtualization", In Proceedings of the 19th ACM Symposium on Operating Systems Principles (SOSP'03), Bolton Landing, NY, USA, Oct. 19-22, 2003.

Beck, M. and Tews, E., "Practical Attacks Against WEP and WPA", In Proceedings of the 2nd ACM Conference on Wireless Network Security (WiSec'09), Zurich, CH, Mar. 16-18, 2009, pp. 79-85.

Bell, D.E. and LaPadula, L.J., "Secure Computer Systems: Mathematical Foundations and Model", Technical Report ESD-TR-74-244, Mitre Corp, Bedford, MA, USA, Nov. 1973, pp. 1-33.

Bellard, F., "QEMU, a Fast and Portable Dynamic Translator", In Proceedings of USENIX Annual Technical Conference, Anaheim, CA, USA, Apr. 2005, pp. 41-46.

Bittau, A., et al., "The Final Nail in WEP's Coffin", In Proceedings of the 2006 IEEE Symposium on Security and Privacy (S&P'06), May 2006, pp. 386-400.

Bloom B.H., "Space/Time Trade-Offs in Hash Coding with Allowable Errors", In Communications of the ACM, vol. 13 No. 7, Jul. 1970, pp. 422-426.

Bond, M. and Danezis, G., "A Pact with the Devil", In Proceedings of the New Security Paradigms Workshop (NSPW 2006), Schloss Dagstuhl, DE, Sep. 19-22, 2006, pp. 77-83.

Borders, K., et al., "Siren: Catching Evasive Malware", In Proceedings of the IEEE Symposium on Security and Privacy (S&P), Oakland, CA, USA, May 2006, pp. 78-85.

Bowen, B.M., et al., "Automating the Injection of Believable Decoys to Detect Snooping", In Proceedings of the Third ACM Conference on Wireless Network Security (WiSec'10), Hoboken, NJ, USA, Mar. 22-12, 2010, pp. 81-86.

Bowen, B.M., et al., "Baiting Inside Attackers Using Decoy Documents", In Proceedings of the 5th International ICST Conference on Security and Privacy in Communication Networks, (SecureComm 2009), Sep. 2009.

Bowen, B.M., et al., "Designing Host and Network Sensors to Mitigate the Insider Threat", In IEEE Security & Privacy Magazine, vol. 7, No. 6, Nov./Dec. 2009, pp. 22-29.

Butler, J., and Sparks, S., "Spyware and Rootkits: The Future Convergence", In Login, vol. 29, No. 6, Dec. 2004, pp. 8-15.

CERT Advisory CA-2001-19, "Code Red Worm Exploiting Buffer Overflow in IIS Indexing Service DLL", Jul. 2001, available at: http://www.cert.org/advisories/CA-2001-19.html.

CERT Advisory CA-2001-26, "Nimda Worm", Sep. 25 2001, available at: http://www.cert.org/advisories/CA-2001-26.html.

CERT Advisory CA-2003-04, "MS-SQL Server Worm", Jan. 27, 2003, available at: http://www.cert.org/advisories/CA-2003-04.html.

CERT Advisory CA-2003-20: "W32/Blaster Worm", Aug. 2003, available at: http://www.cert.org/advisories/CA-2003-20.html.

Chandrasekaran, M., et al., "Spycon: Emulating User Activities to Detect Evasive Spyware", In Proceedings of the Performance, Computing, and Communications Conference (IPCCC), New Orleans, LA, USA, May 2007, pp. 502-509.

Chen, P.M. and Noble, B.D., "When Virtual is Better Than Real", In Proceedings of the 8th Workshop on Hot Topics in Operating System (HotOS), Washington, DC, USA, May 2001, pp. 133-138.

Chinchani, R., et al., "Racoon: Rapidly Generating User Command Data for Anomaly Detection from Customizable Templates", In Computer Security Applications Conference, 20th Annual Volume, Dec. 6-10, 2004, pp. 1-16.

Chou, N., et al., "Client-Side Defense Against Web-Based Identity Theft", In Proceedings of the ISOC Symposium on Network and Distributed Systems Security (SNDDS), Feb. 2004, pp. 1-16.

(56) References Cited

OTHER PUBLICATIONS

Christodorescu, M. and Jha, S., "Static Analysis of Executables to Detect Malicious Patterns", In Proceedings of the 12th USENIX Security Symposium, Washington, D.C., USA, Aug. 4-8, 2003, pp. 169-186.

Christodorescu, M. and Jha, S., "Testing Malware Detectors", In Proceedings of the ACM SIGSOFT International Symposium on Software Testing and Analysis (ISSTA'04), Boston, MA, USA, Jul. 11-14, 2004, pp. 1-11.

Clark, D.D. and Wilson, D.R., "A Comparison of Commercial and Military Computer Security Policies", In Proceedings of the IEEE Symposium on Security and Privacy, 1987, pp. 184-194.

Costa, P.C.G., et al., "DTB Project: A Behavioral Model for Detecting Insider Threats", In International Conference on Intelligence Analysis, McLean, VA, USA, 2005.

Coull, S., et al., "Intrusion Detection: A Bioinformatics Approach", In Proceedings of the 19th Annual Computer Security Applications Conference, Las Vegas, NV, USA, Dec. 2003, pp. 24-33.

Coull, S.E. and Szymanski, B.K., "Sequence Alignment for Masquerade Detection", In Computational Statistics & Data Analysis, vol. 52, No. 8, Apr. 15, 2008, pp. 4116-4131.

Cover, T.M. and Hart, P.E., "Nearest Neighbor Pattern Classification", IEEE Transactions on Information Theory, vol. IT-13, No. 1, Jan. 1967 pp. 21-27.

Cracknell, P., et al., "The Wireless Security Survey of New York City", Technical Report, RSA, The Security Division of EMC, 2008, pp. 1-9.

Cui, W., et al., "Protocol-Independent Adaptive Replay of Application Dialog", In Proceedings of the 13th Symposium on Network and Distributed System Security (SNDSS), Feb. 2006.

Cully, B., et al., "Remus: High Availability via Asynchronous Virtual Machine Replication", In Proceedings of the USENIX Symposium on Networked Systems Design and Implementation (NSDI '08), San Francisco, CA, USA, Apr. 2008, pp. 161-174.

Dagon, D., et al., "HoneyStat: Local Worm Detection Using Honeypots", In Proceedings of the 7th International Symposium on Recent Advances in Intrusion Detection (RAID), Oct. 2004, pp. 39-58.

Damashek, M., "Gauging Similarity with N-Grams: Language-Independent Categorization of Text", In Science, vol. 267, No. 5199, Feb. 10, 1995, pp. 843-848.

Dark Reading, "Researcher Uncovers Massive, Sophisticated Trojan Targeting Top Businesses", Darkreading, Jul. 29, 2009, available at: http://www.darkreading.com/database_security/security/privacy/showArticle.jhtml?articleID=218800077.

Dash, S.K., et al., "Masquerade Detection Using IA Network", In Proceedings of Computer Security Applications Conference (CPSec 2005), 2005, pp. 18-30.

Davison, B.D. and Hirsh, H., "Predicting Sequences of User Actions", In Predicting the Future: AI Approaches to Time-Series Problems, Jul. 1998, pp. 5-12.

De Maesschalck, R., et al., "The Mahalanobis Distance", In Chemometrics and Intelligent Laboratory Conference Systems, vol. 50, No. 1, 2000, pp. 1-18.

Demers, A., et al., "Cayuga: A General Purpose Event Monitoring System", In Proceedings of CIDR, 2007, pp. 412-422.

Detristan, T., et al., "Polymorphic Shellcode Engine Using Spectrum Analysis", Phrack 2003 [cited Mar. 28, 2006]; Available from: http://www.phrack.org/issues.html?issue=61&id=9.

Dovrolis, C., et al., "Packet-Dispersion Techniques and a Capacity-Estimation Methodology", In IEEE/ACM Transactions on Networking, vol. 12, No. 6, Dec. 2004, pp. 963-977.

Dubendorfer, T., et al., "Flow-Level Traffic Analysis of the Blaster and Sobig Worm Outbreaks in an Internet Backbone", In Proceedings of the Conference on Detection of Intrusions and Malware & Vulnerability Assessment (DIMVA), Jul. 2005, pp. 103-122.

DuMouchel, W., "Computer Intrusion Detection Based on Bayes Factors for Comparing Command Transition Probabilities", Technical Report TR91: National Institute of Statistical Sciences, Feb. 1999.

Egele, M., et al., "Dynamic Spyware Analysis", In Proceedings of the USENIX Annual Technical Conference, Santa Clara, CA, USA, Jun. 2007, pp. 233-246.

Forrest, S., et al., "A Sense of Self for Unix Processes", In Proceedings of the IEEE Symposium on Research in Security and Privacy, Washington, DC, USA, 1996, pp. 120-128.

Frias-Martinez, V., et al., "Behavior-Based Network Access Control: A Proof-of-Concept", In the Proceedings of the 11th Information Security Conference (ISC '08), Taipei, Taiwan, 2008, pp. 175-190.

Friess, N. and Aycock, J., "Black Market Botnets", In Technical Report TR 2007-873-25, Department of Computer Science, University of Calgary, Jul. 2007, pp. 1-14.

Garfinkel, T., et al. "A Virtual Machine Introspection Based Architecture for Intrusion Detection", Proceedings of the 10th Network and Distributed System Security Symposium (NDSS), Feb. 2003, pp. 191-206.

Garfinkel, T., et al., "Compatibility is Not Transparency: VMM Detection Myths and Realities", In Proceedings of the 11th USENIX Workshop on Hot Topics in Operating Systems (HOTOS'07), San Diego, CA, USA, May 7-9, 2007.

Gartner, Press Release: "Gartner Survey Shows Phishing Attacks Escalated in 2007; More than $3 Billion Lost to These Attacks", Dec. 17, 2009, available at: http://www.gartner.com/it/page.jsp?id=565125.

Ghosh, A.K., et al., "Learning Program Behavior Profiles for Intrusion Detection", In Proceedings 1st USENIX Workshop on Intrusion Detection and Network Monitoring (ID'99), Santa Clara, CA, USA, Apr. 9-12, 1999, pp. 51-62.

Goel, S., "Kolmogorov Complexity Estimates for Detection of Viruses in Biologically Inspired Security Systems: A Comparison with Traditional Approaches", In Complexity Journal, vol. 9, No. 2, Nov.-Dec. 2003, pp. 1-45.

Goldring, T., "User Profiling for Intrusion Detection in Windows NT", In 35th Symposium on the Interface, 2003, pp. 1-4.

Gordon, L.A., et al., "CSI/FBI Computer Crime and Security Survey", 2006, pp. 1-27.

Graham, R.D., "SideJacking with Hamster", Technical Report, Errata Security, Aug. 5, 2007.

Hall, M., et al., "The WEKA Data Mining Software: An Update", In ACM SIGKDD Explorations Newsletter, vol. 11, No. 1, Jun. 2009, pp. 10-18.

Harmon, D., et al., "Robust Treatment of Simultaneous Collisions", In SIGGRAPH ACM Transactions on Graphics, vol. 27, No. 3, Aug. 2008, pp. 1-4.

Higgins, K.J., "Up to 9 Percent of Machines in an Enterprise are Bot-Infected", Sep. 24, 2009, Darkreading, available at: http://www.darkreading.com/insiderthreat/security/client/showArticle.jhtml?articleID=220200118.

Hirschberg, D.S., "A Linear Space Algorithm for Computing Maximal Common Subsequences", In Communications of the ACM, vol. 18, No. 6, Jun. 1975, pp. 341-343.

Holz, T., "A Short Visit to the Bot Zoo", In IEEE Security & Privacy, vol. 3, No. 3, May/Jun. 2005, pp. 76-79.

Holz, T., et al., "Learning More About the Underground Economy: A Case-Study of Keyloggers and Dropzones", In Lecture Notes in Computer Science (LNCS), vol. 5789, Sep. 2009, pp. 1-18.

Hong, S.S., and Wu, S.F., "On Interactive Internet Traffic Replay", In Proceedings of the 8th International Symposium on Recent Advances in Intrusion Detection (RAID), Sep. 2005, pp. 247-264.

Ilett, D., "Trojan Attacks Microsoft's Anti-Spyware", CNET News, Feb. 9, 2005, available at: http://news.cnet.com/Trojan-attacks-Microsofts-anti-spyware/2100-7349_3-5569429.html.

International Patent Application No. PCT/US2007/012811, filed May 31, 2007.

International Patent Application No. PCT/US2008/066623, filed Jun. 12, 2008.

International Preliminary Report on Patentability in International Patent Application No. PCT/US2007/012811, filed May 31, 2007, issued Dec. 3, 2008.

International Preliminary Report on Patentability in International Patent Application No. PCT/US2008/066623, filed Jun. 12, 2008, mailed Dec. 30, 2009.

(56) References Cited

OTHER PUBLICATIONS

International Search Report in International Patent Application No. PCT/US2007/012811, filed May 31, 2007, mailed Jul. 17, 2008.

International Search Report in International Patent Application No. PCT/US2008/066623, filed Jun. 12, 2008, mailed Feb. 13, 2009.

Jagatic, T., "Social Phishing", School of Informatics, Indiana University, Bloomington, Dec. 12, 2005, pp. 1-10.

Jha, S., et al, "A Filtering Approach to Anomaly and Masquerade Detection", Technical Report, University of Wisconsin, Madison, 2004, pp. 1-21.

Jiang, X., and Wang, X., "'Out-of-the-Box' Monitoring of VM-Based High-Interaction Honeypots", In Proceedings of the 10th International Symposium on Recent Advances in Intrusion Detection (RAID), Cambridge, MA, USA, Sep. 2007, pp. 198-218.

Jones, A.K., and Sielken, R.S., "Computer System Intrusion Detection: A Survey", Computer Science Technical Report, University of Virginia, Feb. 9,2000, pp. 1-25.

Jones, S.T., et al., "Antfarm: Tracking Processes in a Virtual Machine Environment", In Proceedings of the USENIX Annual Technical Conference, Boston, MA, USA, Mar. 2006, pp. 1-14.

Ju, W.H. and Vardi, Y., "A Hybrid High-Order Markov Chain Model for Computer Intrusion Detection", Technical Report No. 92, National Institute of Statistical Sciences, Feb. 1999, pp. 1-24.

Karim, M.E., et al., "Malware Phylogeny Generation using Permutations of Code", In Journal in Computer Virology, vol. 1, Nos. 1-2, 2005, pp. 13-23.

Killourhy, K. and Maxion, R.A., "Investigating a Possible Flaw in a Masquerade Detection System", Technical Report CS-TR-896, University Newcastle University, Nov. 2004, pp. 1-11.

Killourhy, K.S. and Maxion, R.A., "Comparing Anomaly-Detection Algorithms for Keystroke Dynamics", In IEEE/IFIP International Conference on Dependable Systems & Networks (DSN '09), Jun. 29-Jul. 2, 2009, pp. 125-134.

Klimt, B. and Yang, Y., "Introducing the Enron Corpus", In Proceedings of Third Conference on Email and Anti-Spam (CEAS 2006), Mountain View, CA, USA, Jul. 27-28, 2006.

Kolesnikov, O. and Lee, W., "Advanced Polymorphic Worms: Evading IDS by Blending in with Normal Traffic", In Proceedings of the USENIX Security Symposium, Vancouver, BC, Canada, 2006, pp. 1-22.

Kravets, D., "From Riches to Prison: Hackers Rig Stock Prices", Wired Blog Network, Sep. 8, 2008, available at: www.wired.com/threatlevel/2008/09/from-riches-to/.

Krebs, B., "Web Fraud 2.0: Validating Your Stolen Goods", The Washington Post, Aug. 20, 2008.

Lane, T. and Brodley, C.E., "Sequence Matching and Learning in Anomaly Detection for Computer Security", In AAAI-97 Workshop on AI Approaches to Fraud Detection and Risk Management, 1997, pp. 43-49.

Laskey, K., et al., "Detecting Threatening Behavior Using Bayesian Networks", In Proceedings of the Conference on Behavioral Representation in Modeling and Simulation, 2004.

Lee, W. and Xiang, D., "Information—Theoretic Measures for Anomaly Detection", In Proceedings of the IEEE Symposium on in Security and Privacy (S&P 2001), 2001, pp. 130-143.

Li, L. and Manikopoulos C.N., "Windows NT One-Class Masquerade Detection", In Proceedings from the Fifth Annual IEEE Workshop on Information Assurance, West Point, NY, USA, Jun. 2004, pp. 82-87.

Li, M., et al., "WBest: a Bandwidth Estimation Tool for IEEE 802.11 Wireless Networks", In Proceedings of the 33rd IEEE Conference on Local Computer Networks (LCN), Oct. 2008, pp. 374-381.

Li, W.J., et al., "A Study of Malcode-Bearing Documents", In Proceedings of the 4th International Conference on Detection of Intrusions and Malware, and Vulnerability Assessment (DIMVA '07), 2007, pp. 231-250.

Li, W.J., et al., "Fileprints: Identifying File Types by N-Gram Analysis", In Proceedings from the Sixth Annual IEEE SMC Information Assurance Workshop (IAW '05), West Point, NY, USA, Jun. 15-17, 2005, pp. 64-71.

Lindahl, G., "MS Outlook to Unix Mailbox Conversion Mini Howto", Jan. 8, 2004, available at: http://tldp.org/HOWTO/pdf/Outlook-to-Unix-Mailbox.pdf.

Lippmann, R.P., et al., "Evaluating Intrusion Detection Systems: The 1998 DARPA Off-Line Intrusion Detection Evaluation", In Proceedings of the 2000 DARPA Information Survivability Conference and Exposition (DISCEX '02), vol. 2., 2000, pp. 12-26.

Maloof, M.A. and Stephens, G.D., "ELICIT: A System for Detecting Insiders Who Violate Need-to-Know", In Proceedings of the 10th International Conference on Recent Advances in Intrusion Detection (RAID '07), 2007, pp. 146-166.

Maxion, R.A. and Townsend T.N., "Masquerade Detection Using Truncated Command Lines", In International Conference on Dependable Systems & Networks, Washington, DC, USA, Jun. 23-26, 2002, pp. 219-228.

Maxion, R.A. and Townsend, T.N., "Masquerade Detection Augmented with Error Analysis", In IEEE Transactions on Reliability, vol. 53, No. 1, Mar. 2004, pp. 124-147.

Maxion, R.A., "Masquerade Detection Using Enriched Command Lines", In Proceedings of the International Conference on Dependable Systems & Networks, San Francisco, CA, USA, Jun. 22-25, 2003, pp. 5-14.

Maybury, M., et al., "Analysis and Detection of Malicious Insiders", In International Conference on Intelligence Analysis, McLean, VA, USA, 2005.

McDaniel, M. and Hossain, H.M., "Content Based File Type Detection Algorithms", In Proceedings of the 36th Annual Hawaii International Conference on System Sciences (HICSS'03), Jan. 6-9, 2003, pp. 1-10.

McGlasson, L., "TJX Update: Breach Worse Than Reported", Technical Report, Bank Info Security, Oct. 26, 2007, available at: http://www.bankinfosecurity.com/tjx-update-breach-worse-than-reported-a-606.

McRae, C.M. and Vaughn, R.B., "Phighting the Phisher: Using Web Bugs and Honeytokens to Investigate the Source of Phishing Attacks", In Proceedings of the 40th Annual Hawaii International Conference on System Sciences (HICSS 2007), Jan. 2007.

Medina, A., et al., "Traffic Matrix Estimation: Existing Techniques and New Directions", In ACM SIGCOMM Computer Communication Review (SIGCOMM'02), vol. 32, No. 4, Pittsburgh, PA, USA, Aug. 19-23, 2002, pp. 161-174.

Messmer, E., "America's 10 Most Wanted Botnets", Network World, Jul. 22, 2009, available at: http://www.networkworld.com/news/2009/072209-botnets.html.

Michael J.B., et al., "Software Decoys: Intrusion Detection and Countermeasures", In Proceedings of the 2002 IEEE Workshop on Information Assurance, West Point, NY, USA, Jun. 2002.

Microsoft Security Bulletin 912840, "Vulnerability in Graphics Rendering Engine Could Allow Remote Code Execution", Jan. 5, 2006, available at: http://www.microsoft.com/technet/security/advisory/912840.mspx.

Monrose, F. and Rubin, A., "Authentication via Keystroke Dynamics", In Proceedings of the 4th ACM Conference on Computer and Communications Security (CCS '97), Zurich, Switzerland, 1997, pp. 48-56.

Monterio Jr., V., "How Intrusion Detection Can Improve Software Decoy Applications", Masters Thesis, Naval Postgraduate School, Monterey, CA, USA, Mar. 2003, pp. 1-69.

Moore, D., et al., "Code-Red: A Case Study on the Spread and Victims of an Internet Worm", In Proceedings of the 2nd Internet Measurement Workshop (MWw'02), Marseille, FR, Nov. 6-8, 2002, pp. 273-284.

Morse, A., "Google's Gmail Service Suffers Another Shutdown", Technical Report, Wall Street Journal, Mar. 11, 2009, available at: http://online.wsj.com/article/SB123673492963090721.html.

Moshchuk, A., et al., "A Crawler-based Study of Spyware in the Web," In Proceedings of the ISOC Symposium on Network and Distributed System Security (SNDSS), Feb. 2006, pp. 1-17.

Naor, M. and Yung, M., "Universal One-Way Hash Functions and their Cryptographic Applications", In Proceedings of the Twenty-First Annual ACM Symposium on Theory of Computing (STOC '89), Seattle, WA, USA, 1989, pp. 33-43.

(56) References Cited

OTHER PUBLICATIONS

Nguyen, N., et al., "Detecting Insider Threats by Monitoring System Call Activity", In IEEE Systems, Man and Cybernetics Society Information Assurance Workshop, Jun. 18-20, 2003, pp. 45-52.

Noga, A.J., "A Visual Data Hash Method", Air Force Research Report, Oct. 2004.

Oka, M., et al, "Anomaly Detection Using Layered Networks Based on Eigen Co-Occurrence Matrix", In International Symposium on Recent Advances in Intrusion Detection (RAID '04), vol. 3224, 2004, pp. 223-237.

Oka, M., et al., "Eigen Co-Occurrence Matrix Method for Masquerade Detection", In The 7th JSSST SIGSYS Workshop on Systems for Programming and Applications (SPA2004), Nagano, JP, Mar. 2004, pp. 1-7.

Oudot, L., "Wireless Honeypot Countermeasures", Technical Report, Security Focus, Feb. 13, 2004.

Pappas, V., et al., "Crimeware Swindling Without Virtual Machines", In Proceedings of the 13th International Conference on Information Security (ISC'10), 2010, pp. 196-202.

Pappas, V., et al., "Evaluation of Spyware Detection System Using Thin Client Computing", In Proceedings of the 13th International Conference on Information Security and Cryptology (ICISC'10), 2010, pp. 222-232.

Pereira, J., "How Credit-Card Data Went out Wireless Door", Wall Street Journal, May 4, 2007.

Petroni, Jr., N.L., et al., "Copilot—A Coprocessor-Based Kernel Runtime Integrity Monitor", In Proceedings of the 13th USENIX Security Symposium, San Diego, CA, USA, Aug. 9-13, 2004, pp. 179-194.

Phyo, A.H. and Furnell, S.M., "A Detection-Oriented Classification of Insider IT Misuse", In Proceedings of the 3rd Security Conference, Las Vegas, NV, USA, Apr. 14-15, 2004.

Prevelakis, V. and Spinellis, D., "The Athens Affair", In IEEE Spectrum, vol. 44, No. 7, Jul. 2007, pp. 26-33.

Provos, N., "A Virtual Honeypot Framework", In Proceedings of the 13 USENIX Security Symposium, San Diego CA, USA, Aug. 9-13, 2004, pp. 1-14.

Randazzo, M.R., et al., "Insider Threat Study: Illicit Cyber Activity in the Banking and Finance Sector", Technical Report, Carnegie Mellon University, Jun. 2005, pp. 1-28.

Richardson, R., "CSI Computer Crime & Security Survey", 2008, pp. 1-30.

Rivest, R.L., "Chaffing and Winnowing: Confidentiality without Encryption", In The Technical Newsletter of RSA Laboratories, Summer 1998, pp. 12-17.

Sailer, R., et al., "Design and Implementation of a TCG-based Integrity Measurement Architecture", In Proceedings of the 13 USENIX Security Symposium, San Diego, CA, USA, Aug. 9-13, 2004, pp. 223-238.

Salem, M.B. and Stolfo, S.J., "Masquerade Attack Detection Using a Search-Behavior Modeling Approach", Technical Report CUCS-027-09, Department of Computer Science, Columbia University, 2009, pp. 1-17.

Salem, M.B. and Stolfo, S.J., "Masquerade Detection Using a Taxonomy-Based Multinomial Modeling Approach in UNIX Systems", Technical Report # CUCS-021-08, Department of Computer Science, Columbia University, 2008, pp. 1-14.

Salem, M.B., et al., "A Survey of Insider Attack Detection Research", In Insider Attack and Cyber Security: Beyond the Hacker, (Eds., Stolfo, Bellovin, Hershkop, Keromytis, Sinclaire, and Smith), Springer, 2008, pp. 69-90.

Salem, M.B., et al., "Modeling User Search-Behavior for Masquerade Detection", Technical Report # CUCS-014-10, Columbia University Department of Computer Science, 2010, pp. 1-20.

Saroiu, S., et al., "Measurement and Analysis of Spyware in a University Environment", In Proceedings of the 1st Symposium on Networked Systems Design and Implementation (NSDI), San Francisco, CA, USA, Mar. 29-31, 2004, pp. 141-153.

Schonlau, M., "Masquerading User Data", 2009, available at: http://www.schonlau.net/intrusion.html.

Schonlau, M., et al., "Computer Intrusion: Detecting Masquerades", In Statistical Science, vol. 16, No. 1, 2001, pp. 58-74.

Schultz, E.E., "A Framework for Understanding and Predicting Insider Attacks", In Journal of Computers and Security, vol. 21, No. 1, Oct. 1, 2002, pp. 526-531.

Schultz, M.G., et al., "Data Mining Methods for Detection of New Malicious Executables", In Proceedings of the IEEE Symposium on Security and Privacy, Oakland, CA, USA, May 2001, pp. 38-49.

Seo, J. and Cha, S., "Masquerade Detection Based on SVM and Sequence-Based User Commands Profile", In Proceedings of the 2nd ACM Symposium on Information, Computer and Communications Security (ASIACCS '07), Singapore, Mar. 20-22, 2007, pp. 398-400.

Shavlik, J. and Shavlik, M., "Selection, Combination, and Evaluation of Effective Software Sensors for Detecting Abnormal Computer Usage", In Proceedings of the Tenth ACM SIGKDD International Conference on Knowledge Discovery and Data Mining (KDD '04), Seattle, WA, USA, Aug. 22-25, 2004, pp. 276-285.

Smith, S., "Magic Boxes and Boots: Security in Hardware", In IEEE Computer, vol. 37, No. 10, Oct. 2004, pp. 106-109.

Sommers, J. and Barford, P., "Self-Configuring Network Traffic Generation", In Proceedings of the 4th ACM SIGCOMM Conference on Internet Measurement (IMC '04), Taormina, Sicily, IT, Oct. 25-27, 2004, pp. 68-81.

Song, Y., et al., "On the Infeasibility of Modeling Polymorphic Shellcode", In Proceedings of the 14th ACM Conference on Computer and Communications Security (CCS'07), Oct. 29-Nov. 2, 2007, Alexandria, VA, USA, pp. 541-551.

Spitzner, L., "Honeypots: Catching the Insider Threat", In Proceedings of the 19th Annual Computer Security Applications Conference, Dec. 8-12, 2003, pp. 170-179.

Spitzner, L., "Honeytokens: The Other Honeypot", Technical Report, Security Focus, Jul. 17, 2003.

Srivastava, A. and Giffin, J., "Tamper-Resistant, Application-Aware Blocking of Malicious Network Connections", In Proceedings of the 11th International Symposium on Recent Advances in Intrusion Detection (RAID), Cambridge, MA, USA, Sep. 2008, pp. 39-58.

Stahlberg, M., "The Trojan Money Spinner", Technical Report, F-Secure Corporation, Sep. 2007, pp. 1-7, available at: http://www.f-secure.com/weblog/archives/VB2007_TheTrojanMoneySpinner.pdf.

Stolfo, S.J., et al., "A Comparative Evaluation of Two Algorithms for Windows Registry Anomaly Detection", In Journal of Computer Security, vol. 13, No. 4, 2005, pp. 659-693.

Stolfo, S.J., et al., "Towards Stealthy Malware Detection", Malware Detection Book, Springer Verlag, (Jha, Christodorescu, Wang, Eds.), 2006.

Stolfo, S.J., et al., "Anomaly Detection in Computer Security and an Application to File System Accesses", In Lecture Notes in Computer Science, vol. 3488, 2005, pp. 14-28.

Stolfo, S.J., et al., "Fileprint Analysis for Malware Detection", Technical Report, Columbia University, Jun. 2005.

Stolfo, S.J., et al., "Insider Attack and Cyber Security: Beyond the Hacker", Springer, 2008.

Stoll, C., "Stalking the Wily Hacker", In Communications of the ACM, vol. 31, No. 5, May 1988, pp. 484-497.

Symantec, "Global Internet Security Threat Report: Trends for Jul.-Dec. 2007", Apr. 2008, pp. 1-97.

Szor, P. and Ferrie, P., "Hunting for Metamorphic", Technical Report, Symantec Corporation, Jun. 2003, pp. 1-23.

Szymanski, B.K. and Zhang, Y., "Recursive Data Mining for Masquerade Detection and Author Identification", In Proceedings from the Fifth Annual IEEE SMC Information Assurance Workshop, West Point, NY, USA, Jun. 10-11, 2004, pp. 424-431.

Tan, K.M.C. and Maxion, R.A., "'Why 6?' Defining the Operational Limits of Stide, and Anomaly-Based Intrusion Detector", In IEEE Symposium on Security and Privacy, Nov. 2002, pp. 188-201.

The Honeynet Project, "Know Your Enemy: Sebek, A Kernel Based Data Capture Tool", Technical Report, Nov. 17, 2003, pp. 1-21.

Trusteer, "Measuring the In-the-Wild Effectiveness of Antivirus Against Zeus", Technical Report, Sep. 14, 2009, available at: www.trusteer.com/files/Zeus_and_Antivirus.pdf.

(56) References Cited

OTHER PUBLICATIONS

Tsow, A., et al., "Warkitting: The Drive-by Subversion of Wireless Home Routers", In Journal of Digital Forensic Practice, vol. 1, No. 3, 2006, pp. 179-192.
Turing, A.M., "Computing Machinery and Intelligence", In Mind, New Series, vol. 59, No. 236, Oct. 1950, pp. 433-460.
Tygar, J.D. and Yee, B., "DYAD: A System for Using Physically Secure Coprocessors", Technical Report CMU-CS-91-140R, Carnegie Mellon University, May 1991, pp. 1-36.
U.S. Appl. No. 12/565,394, filed Sep. 23, 2009.
U.S. Appl. No. No. 12/628,587, filed Dec. 1, 2009.
U.S. Appl. No. 12/982,984, filed Dec. 31, 2010.
U.S. Appl. No. 13/166,723, filed Jun. 22, 2011.
U.S. Appl. No. 60/809,898, filed May 31, 2006.
U.S. Appl. No. 60/934,307, filed Jun. 12, 2007.
U.S. Appl. No. 61/044,376, filed Apr. 11, 2008.
U.S. Appl. No. 61/099,526, filed Sep. 23, 2008.
U.S. Appl. No. 61/119,294, filed Dec. 2, 2008.
U.S. Appl. No. 61/119,540, filed Dec. 3, 2008.
U.S. Appl. No. 61/165,634, filed Apr. 1, 2009.
U.S. Appl. No. 61/291,712, filed Dec. 31, 2009.
U.S. Appl. No. 61/357,481, filed Jun. 22, 2010.
Vandat, A., et al., "Scalability and Accuracy in a Large-Scale Network Emulator", In Proceedings of the 5th Symposium on Operating Systems Design and Implementation (OSDI), Boston, MA, USA, Dec. 9, 2002, pp. 261-284.
Vargiya, R. and Chan, P., "Boundary Detection in Tokenizing Network Application Payload for Anomaly Detection,", Technical Report CS-2003-21, Department of Computer Sciences, Florida Institute of Technology, 2003.
Vasudevan, A. and Yerraballi, R., "Cobra: Fine-grained Malware Analysis using Stealth Localized-Executions", In Proceedings of the IEEE Security & Privacy Symposium, May 2006.
Vishwanath, K.V. and Vandat, A., "Realistic and Responsive Network Traffic Generation", In ACM SIGCOMM Computer Communication Review (SIGCOMM'06), vol. 36, No. 4, Pisa, Italy, Sep. 11-15, 2006, pp. 111-122.
Walsh, T.J. and Kuhn, D.R., "Challenges in Securing Voice over IP", In IEEE Security & Privacy Magazine, vol. 3, No. 3, May/Jun. 2005, pp. 44-49.
Wang, K. and Stolfo, S.J., "Anomalous Payload-Based Network Intrusion Detection", In Proceedings of the 7th International Symposium on Recent Advances in Intrusion Detection (RAID), Sep. 2004, pp. 203-222.
Wang, K. and Stolfo, S.J., "One-Class Training for Masquerade Detection", In Workshop on Data Mining for Computer Security (DMSEC), Melbourne, FL, USA, Nov. 19-22, 2003.
Wang, K., et al., "Anagram: A Content Anomaly Detector Resistant to Mimicry Attack", In Proceedings of the International Conference on Recent Advanced in Intrusion Detection (RAID '06), Sep. 2006, pp. 1-20.
Wang, K., et al., "Anomalous Payload-Based Worm Detection and Signature Generation", In Proceedings of the 8th International Symposium on Recent Advances in Intrusion Detection (RAID), Sep. 2005, pp. 227-246.
Wang, Y.M., et al., "Automated Web Patrol with Strider HoneyMonkeys: Finding Web Sites That Exploit Browser Vulnerabilities", In Proceedings of the 13th Annual Network and Distributed System Security Symposium (NDSS 2006), San Diego, CA, USA, Feb. 2006.
Watson, D., et al., "Know Your Enemy: Phishing", Technical Report, May 16, 2005, available at: http://www.honeynet.org/papers/phishing/.
Willems, C., et al., "Toward Automated Dynamic Malware Analysis Using CWSandbox", In Proceedings of the IEEE Symposium on Security and Privacy (S&P), Oakland, CA, USA, Mar. 2007, pp. 32-39.
Written Opinion in International Patent Application No. PCT/US2007/012811, filed May 31, 2007, mailed Jul. 17, 2008.
Written Opinion in International Patent Application No. PCT/US2008/066623, filed Jun. 12, 2008, mailed Feb. 13, 2009.
Yang, J., et al., "Automatically Generating Malicious Disks using Symbolic Execution", In IEEE Symposium on Security & Privacy, May 21-24, 2006, pp. 1-15.
Ye, N., "A Markov Chain Model of Temporal Behavior for Anomaly Detection", In Proceedings of the 2000 IEEE Workshop on Information Assurance and Security, West Point, NY, Jun. 6-7, 2000, pp. 171-174.
Ye, N., et al., "Probabilistic Techniques for Intrusion Detection Based on Computer Audit Data", In IEEE Transactions on Systems, Man and Cybernetics, Part A, vol. 31, No. 4, Jul. 2001, pp. 266-274.
Ye, Z., et al., "Trusted Paths for Browsers", In ACM Transactions on Information and System Security (TISSEC), vol. 8, No. 2, May 2005, pp. 153-186.
Yee, B., "Using Secure Coprocessors", PhD Thesis, Carnegie Mellon University, 1994, pp. 1-91.
Yegneswaran, V., et al., "On the Design and Use of Internet Sinks for Network Abuse Monitoring", In Proceedings of the 7th International Symposium on Recent Advances in Intrusion Detection (RAID'04), Oct. 2004, pp. 146-165.
Yin, H., et al., "Panorama: Capturing System-Wide Information Flow for Malware Detection and Analysis", In Proceedings of the 14th ACM Conference on Computer and Communications Security (CCS), Alexandria, VA, USA, Oct. 29-Nov. 2, 2007, pp. 116-127.
Yuill, J., et al., "Honeyfiles: Deceptive Files for Intrusion Detection", In Proceedings of the 5th Annual IEEE Workshop on Information Assurance, West Point, NY, USA, Jun. 2004, pp. 116-122.
Yuill, J., et al., "Using Deception to Hide Things from Hackers: Processes, Principles, and Techniques", In Journal of Information Warfare, vol. 5, No. 3, Nov. 2006, pp. 26-40.
Yung, K.H., "Using Self-Consistent Naïve-Bayes to Detect Masqueraders", In Stanford Electrical Engineering and Computer Science Research Journal, Spring 2004, pp. 14-21.
Office Action dated Oct. 16, 2012 in U.S. Appl. No. 12/982,984.
Attenberg, J., et al., "Modeling and Predicting User Behavior in Sponsored Search", In Proceedings of the 15th ACM SIGKDD International Conference on Knowledge Discovery and Data Mining (KDD '09), Paris, FR, Jun. 28-Jul. 1, 2009, pp. 1067-1076.
Baeza-Yates, R., et al., "Modeling User Search Behavior", In Proceedings of the 3rd Latin American Web Congress (LA-WEB '05), Buenos Aires, AR, Oct. 31-Nov. 2, 2005, pp. 242-251.
Chang, C.C. and Lin, C.J., "LIBSVM: A Library for Support Vector Machines", Technical Report, Jan. 2008, available at: http://www.csie.ntu.tv/cjlin/libsvm.pdf.
Davison, B.D. and Hirsh, H., "Toward an Adaptive Command Line Interface", In Proceedings of the Seventh International Conference on Human-Computer Interaction, (HCI '97), San Francisco, CA, US, Aug. 24-29, 1997, pp. 505-508.
Dhamija, R., et al., "Why Phishing Works", In Proceedings of the 2006 Conference on Human Factors in Computing Systems (CHI '06), Montreal, QC, CA, Apr. 22-27, 2006, pp. 581-590.
Hoang, M., "Handling Today's Tough Security Threats", In Symantec Official Blog, Nov. 2, 2006, available at: http://www.symantec.com/connect/blogs/handling-todays-tough-security-threats-rootkits.
O'Brien, M., and Keane, M.T., "Modeling User Behavior Using a Search Engine", In Proceedings of the 12th International Conference on Intelligent User Interfaces (IUI '07), Honolulu, HI, US, Jan. 28-31, 2007, pp. 357-360.
Office Action dated Nov. 29, 2012 in U.S. Appl. No. 12/628,587.
Office Action dated Mar. 21, 2012 in U.S. Appl. No. 12/628,587.
Packet Storm, "Antisniff", available at: http://packetstormsecurity.org/sniffers/antisniff/.
Plummer, D. and Greenwood, W., "The History of Nuclear Weapon Safety Devices", In Proceedings of the 34th AIAA/ASME/SAE/ASEE Joint Propulsion Conference, Cleveland, OH, US, Jul. 13-15, 1998, pp. 1-8.
Scholkopf, B., et al., "Estimating the Support of a High-Dimensional Distribution", Technical Report MSR-TR-99-87, Microsoft Research, Sep. 18, 2000, pp. 1-30.

(56) References Cited

OTHER PUBLICATIONS

Teng, H.S., et al., "Adaptive Real-Time Anomaly Detection Using Inductively Generated Sequential Patterns", In Proceedings of the IEEE Symposium on Security and Privacy (S&P '90), Oakland, CA, US, May 7-9, 1990, pp. 278-284.

The XFree86 Project, "The XFree86 Project", available at: http://www.xfree86.org.

Yung, K.H., "Using Self-Consistent Naive-Bayes to Detect Masqueraders", In Proceedings of the Advances in Knowledge Discovery and Data Mining, 8th Pacific-Asia Conference (PAKDD '04), Sydney, AU, May 26-28, 2004, pp. 329-340.

Balajinath, B. and Raghavan, S.V., "Intrusion Detection Through Learning Behavior Model", In Computer Communications, vol. 24, No. 12, Jul. 2001, pp. 1202-1212.

Mahoney et al., "Learning Nonstationary Models of Normal Network Traffic for Detecting Novel Attacks", In Proceedings of the Eighth ACM SIGKDD International Conference on Knowledge Discovery and Data Mining (SIGKDD '02), Edmonton, Alberta, CA, Jul. 23-26, 2002, pp. 376-385.

Notice of Allowance dated Dec. 23, 2013 in U.S. Appl. No. 12/628,587.

Notice of Allowance dated Apr. 29, 2013 in U.S. Appl. No. 12/982,984.

Office Action dated Mar. 5, 2013 in U.S. Appl. No. 12/565,394.
Office Action dated Mar. 7, 2014 in U.S. Appl. No. 13/166,723.
Office Action dated Apr. 3, 2014 in U.S. Appl. No. 12/565,394.
Office Action dated Jul. 17, 2013 in U.S. Appl. No. 13/166,723.
Office Action dated Aug. 16, 2012 in U.S. Appl. No. 12/565,394.
Office Action dated Oct. 11, 2013 in U.S. Appl. No. 12/565,394.

Sekar, R., et al., "A Fast Automaton-Based Method for Detecting Anomalous Program Behaviors", In Proceedings of the IEEE Symposium on Security & Privacy (S&P '01), Oakland, CA, US, May 14-16, 2001, pp. 144-155.

\* cited by examiner

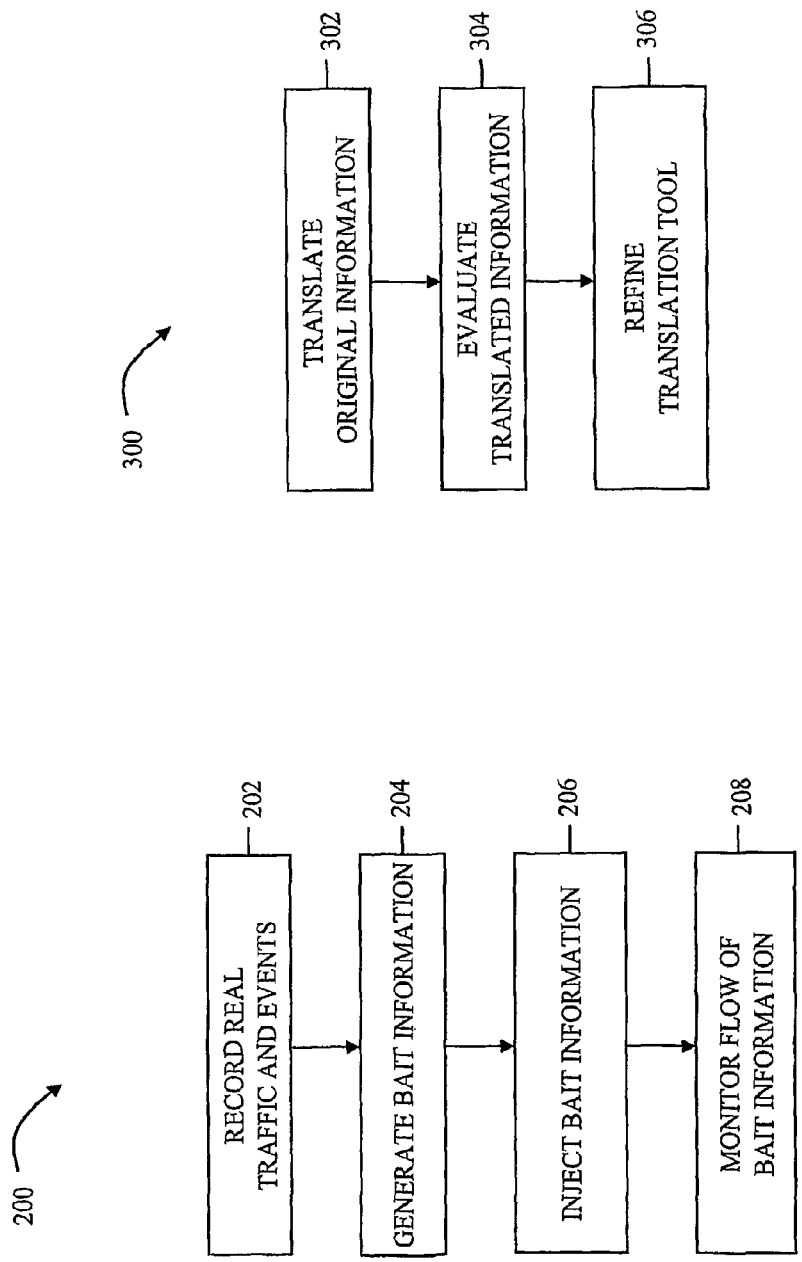

SYSTEMS, METHODS, AND MEDIA FOR GENERATING BAIT INFORMATION FOR TRAP-BASED DEFENSES

CROSS-REFERENCE TO RELATED APPLICATIONS

This application claims the benefit of U.S. Provisional Patent Application No. 60/809,898, filed May 31, 2006, which is hereby incorporated by reference herein in its entirety.

TECHNICAL FIELD

The disclosed subject matter relates to systems, methods, and media for generating bait information for trap-based defenses

BACKGROUND

The increasing prevalence and sophistication of malicious software, also referred to as malware, such as rootkits and spyware, have become first-order threats to the computer system and network security. For example, spyware having the rootkit's ability to conceal its presence can wreak havoc on the computer system and network security.

A rootkit refers to a set of software tools that are used to conceal the presence of running processes, files, and/or system data, such as network connections, memory addresses, and registry entries, from programs used by system administrators. Spyware refers to a large class of software capable of covertly monitoring a system or a network, and transmitting data collected therefrom to third parties. Spyware encompasses network sniffers and keystroke and password loggers.

The ease with which the malware can be inserted into a system or a network through a variety of different delivery methods and apparatus, such as a universal serial bus (USB) flash drive, a compact disk (CD), an email attachment, or files downloaded from unclassified networks, has made the filtering-based prevention mechanism an insufficient defense. Furthermore, the malware's ability to evade detection has also raised concerns about the ability to detect the malware based on its signature or intrinsic behavior, such as system call sequences or memory region accesses.

The industry spends billions of dollars for purely preventive defense mechanisms, such as firewalls, packet filters, and signature- or behavior-based detection. If, however, the preventive defense mechanism fails to stop the malware, the malware can reach systems in a network and cause serious damage to the systems. Damage can be particularly harmful if the malware is left undetected for long periods of time. For example, exploitation of spyware-gleaned information pertinent to a network, such as authentication credentials or server names and IP addresses, can introduce further compromise of other devices and services, leading to an avalanche compromise of the information technology (IT) infrastructure of the network.

SUMMARY

Systems, methods, and media for generating bait information for trap-based defenses are provided. In some embodiments, methods for generating bait information for trap-based defenses are provided. The methods include: recording historical information of a network; translating the historical information; and generating bait information by tailoring the translated historical information.

In some embodiments, computer-readable media, containing computer-executable instructions that, when executed by a processor, cause the processor to perform a method for generating bait information for trap-based defenses, are provided. This method includes: recording historical information of a network automatically; translating the historical information automatically; and generating bait information by tailoring the translated historical information automatically.

In some embodiments, systems for generating bait information for trap-based defenses are provided. The systems include: a recording module capable of recording historical information of a network; a translator capable of translating the historical information; and a tailor module capable of generating bait information by tailoring the translated historical information.

In some embodiments, systems for generating bait information for trap-based defenses are provided. The systems include: a recording element for recording historical information of a network; a translator element for translating the historical information; and a tailor element for generating bait information by tailoring the translated historical information.

BRIEF DESCRIPTION OF THE DRAWINGS

FIG. 2 is a simple illustration of a method for generating bait information for trap-based defenses in accordance with some embodiments of the disclosed subject matter.

FIG. 3 is a simple illustration of a method for transforming original information to bait information in accordance with some embodiments of the disclosed subject matter.

DETAILED DESCRIPTION

Figure 1:
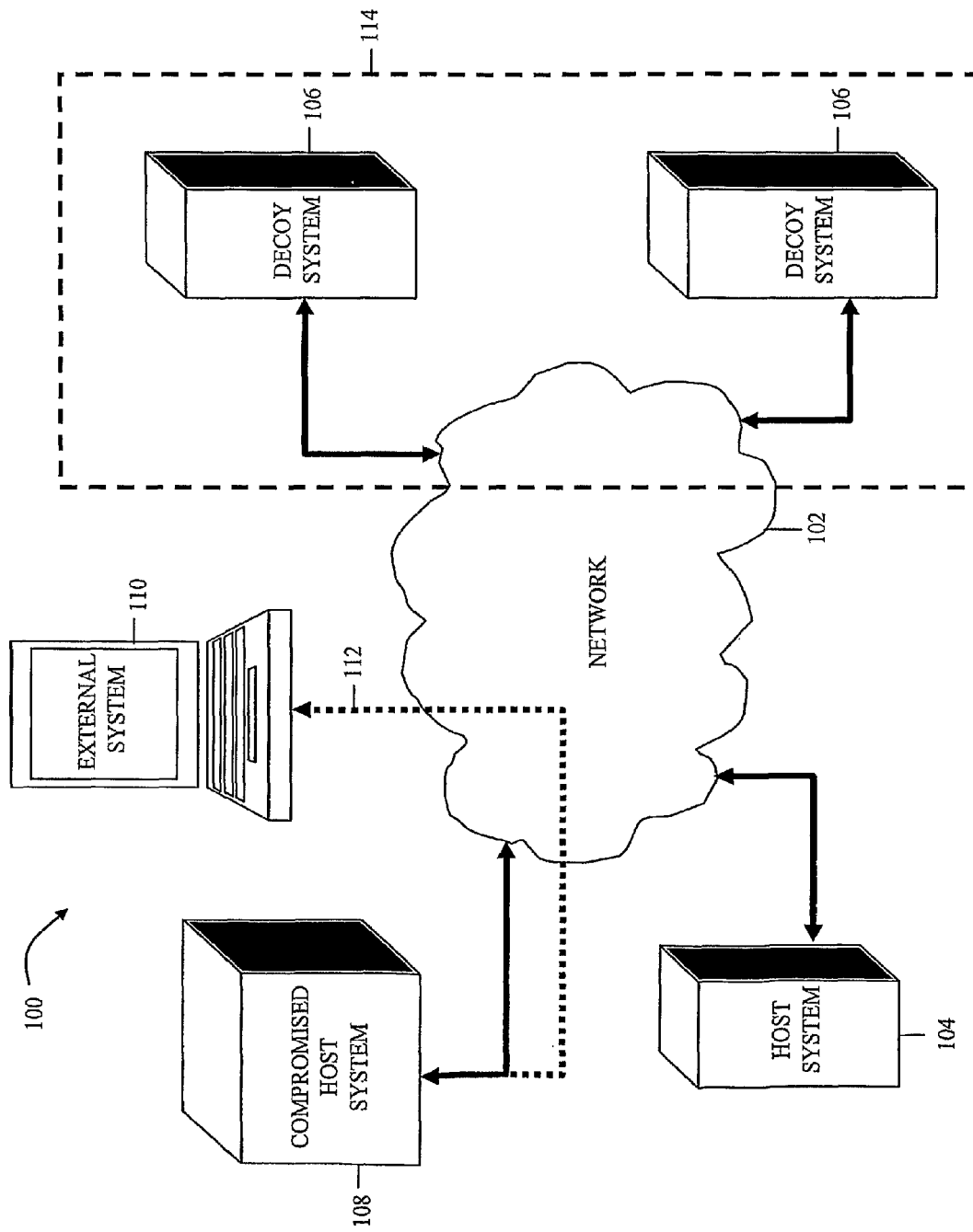
FIG. 1 is a schematic diagram of a system for generating bait information for trap-based defenses in accordance with some embodiments of the disclosed subject matter.

Systems, methods, and media for generating bait information for trap-based defenses are provided. The trap-based defense refers to a proactive defense mechanism that is based on counter-intelligence principles. Whereas the purely preventive defense mechanisms focus on preventing the malware from infiltrating into a network, the trap-based defense focuses on detecting and deceiving the malware that has already succeeded in infiltrating into the network. Traps are set up to attract the malware's attention in order to detect its presence, identify its hideout, feed it with bogus information, and/or destroy it. For example, a stream of bait information, referred to as bait traffic, can be used to attract the malware, such as network sniffers.

In some embodiments of the disclosed subject matter, systems, methods, and media are provided for crafting a stream of bait information by injecting bait information generated using real system events and network traffic that have been recorded. Bait information refers to any data that is designed to lure the malware's attention. A user or host behavior at the level of network flows, application use, and keystroke dynamics can be modeled to generate seemingly valid but boobytrapped bait information. The bait information, in turn, can be used to set up trap-based defenses based on proactive deception to complement the filtering-based reactive defense.

Bait traffic, which can be modeled after legitimate data flows and events, can steer malware that is seeking to make use of bait information towards decoy systems. The decoy systems, in turn, can help discover the identity of compromised systems or internal intruders (e.g., rogue users) in a network. In some embodiments, however, the decoy systems are designed to defer making public the identity of a user suspected of conducting unauthorized activities until sufficient evidence connecting the user with the suspected activities is collected. This additional step, referred to as privacy preservation, is to ensure that no user is falsely accused of conducting unauthorized activities.

The decoy systems also can help discover the identity and/or the location of external attackers (e.g., human intruders) in communication with and/or in control of the malware. In some embodiments, the ultimate goal of setting up the decoy systems is to identify the external attackers.

Bait traffic also can be used to confuse and/or slow down an intruder. For example, the intruder can be forced to spend time and energy, going through the information collected without authorization in order to separate authentic data from bogus data. Also, the bogus data can be designed to contradict the authentic data, confusing the intruder and luring the intruder to risk further actions to clear the confusion.

Referring to FIG. 1, a system 100 includes a network 102, a host system 104, a decoy system 106, a compromised host system 108, an external system 110, an exfiltration channel 112, and a deception infrastructure 114.

Network 102 can be a local area network (LAN), a wide area network (WAN), a wireless network, a cable network, the Internet, and/or various other suitable networks.

Host system 104 can be a device containing one or more processors, such as a general-purpose computer, a special-purpose computer, a digital processing device, a server, a workstation, and/or various other suitable devices. Host system 104 can run programs, such as operating systems (OS), software applications, a library of functions and/or procedures, background daemon processes, and/or various other suitable programs. Host system 104 can also support one or more virtual machines (VM).

Decoy system 106 can be any of the aforementioned types of devices that can run any of the aforementioned types of programs. Decoy system 106 can also include Symantec® Decoy Server for generating traps. Decoy system 106 can be a dedicated server or workstation that constitutes deception infrastructure 114 or a deception network. Decoy system 106 also can be a VM.

Compromised host system 108 can be any of the aforementioned types of devices that can run any of the aforementioned types of programs. In fact, compromised host system 108 can be identical to host system 104 with an exception that compromised host system 108 harbors, or is infected by, malware.

Some malware can passively collect information that passes through compromised host system 108. Some malware can take advantage of trusted relationships between compromised host system 108 and other host systems 104 to expand network access by infecting other host systems 104. Some malware can secretly communicate with external system 110 through exfiltration channel 112 to transmit confidential information.

Deception infrastructure 114 can include one or more decoy systems 106. For example, deception infrastructure 114 can include one or more dedicated servers and/or workstations having closely monitored bait information. Deception infrastructure 114 can also include one or more decoy servers and workstations that are created on-demand on actual servers and workstations to create a realistic target environment. For example, deception infrastructure 114 can include dedicated virtual machines (VMs) that can run on an actual end-user workstation by taking advantages of hardware virtualization techniques.

Deception infrastructure 114 can provide a safe environment to begin studying and refining realistic features of bait information and/or traffic. Deception infrastructure 114 can also provide a safe environment for studying the ability to closely monitor the execution of scripts containing sequences of recorded traffic and events to observe natural performance deviations of network 102 and host systems 104 from the scripts, as well as the ability to distinguish such natural performance deviations from artificially induced deviations.

Referring to FIG. 2, a method 200 generates bait information for trap-based defenses in accordance with some embodiments.

As shown, at 202, real traffic and events are recorded. In some embodiments, information related to traffic and events pertinent to network 102 are recorded. For example, domain name server (DNS) name, Internet Protocol (IP) addresses of communicating host systems 104, authentication credentials (e.g., a password), and the data content of the traffic, such as documents and email messages, are recorded. In some embodiments, events generated by host systems 104, such as keyboard events, are recorded. For example, a set of keyboard events related to an application (e.g., web browser) that indicates typing of a username/password combination or a URL to a web server can be recorded.

In some embodiments, SymEvent framework by Symantec® is used to record statistical characteristics of system events by monitoring, logging, and processing the system calls to the OS made by the programs running on host system 104. In some embodiments, an independent on-host monitoring environment is set up to support transparent recording of real traffic and events, using SymEvent framework with hardware support of Intel®'s LaGrande and Vanderpool secure virtualization technologies, also referred to as Intel® Virtualization Technology.

At 204, bait information is generated. Bait information can include a set of content created within host system 104, a sequence of activities performed by users in host system 104, and proper characterization of how the users performed those activities.

In some embodiments, existing historical information, such as previously recorded network data flows, is used to create traceable, synthetic bait information. Using existing historical information can mitigate the risk of detection by malware, such as network sniffers, because the flow of the bait information generated using the historical information can be very similar to prior traffic that the network sniffers have seen.

In some embodiments, use of the historical information is localized to specific host systems 104 or specific network segments to prevent from accidentally exposing sensitive information. For example, recorded historical information in subnet A is not used in subnet B to avoid exposing sensitive information that would otherwise remain hidden from malware located in subnet B.

In some embodiments, previously recorded events generated by host system 104 are used to create bait information. For example, recorded in-host behavior of host system 104 can be scripted. Using scripts containing a sequence of recorded events describing host system's 104 in-host behavior can be advantageous because the scripts can invoke network functions that emulate host system's 104 on-network behavior.

At 206, bait information is injected. In some embodiments, a surrogate user bot (SUB) is used to inject bait information. An SUB is designed to appear to the OS, software applications, and any malware hidden therein as though its input to the OS and the applications is coming from a living human user who watches a physical screen and uses the physical mouse and keyboard. In some embodiments, an SUB has a decoy account.

In some embodiments, system virtualization techniques are used to facilitate the injection of bait information to feed malware, such as keystroke loggers, lurking on host system 104. For example, an SUB can follow scripts to send events through virtualized keyboard and mouse drivers within a virtualization environment having a virtualization layer beneath the OS and an independent on-host monitoring environment.

In the virtual environment, an SUB can do anything that a normal human user can do in real environment, entirely by inputs through the virtualized keyboard and mouse drivers. For instance, an SUB can be used to post bogus information to blog style web-logs in a decoy server such that the blog, while visible to the malware and potential intruders, is not visible to users who do not look for it in inappropriate ways.

In some embodiments, an entire system, such as host system 104, is dedicated to injecting and receiving bait information. For example, dedicated servers and/or workstations can be filled with closely monitored bait information as part of a network-wide deception infrastructure 114, forming a deception network within a real network.

For instance, the dedicated bait servers and/or workstations can send emails from a decoy account to another decoy account through shared email servers, DNS servers, web servers, and/or various other shared network infrastructures. In some embodiments, publicly available documents that can be found using a search engine, such as Google® and Yahoo®, can be used as attachment to the bogus emails between decoy accounts to make bait traffic more realistic.

In some embodiments, a signaling infrastructure is set up to coordinate the transmission and reception of deception flows between decoy accounts such that only valid deception flows can appear to be accepted by the receiving decoy account, in order to avoid mapping of deception infrastructure 114 by malware.

Injection of keystroke events can be complicated particularly when the events modify the state of the dedicated bait servers and/or workstations. In some embodiments, therefore, snapshots of a real user's environment are taken periodically to replicate the environment, including any hidden malware therein, inside a virtual machine that is not allowed to modify the persistent state (e.g., disk files). Synthetic keyboard events are then created from the host OS to emulate the keystroke events.

In some embodiments, the virtual machine (VM) can be kept alive for a sufficiently long period of time to monitor, among other things, instances of exfiltration of information related to the keystroke events, such as authentication credentials: passwords are the primary target for malware spying on keystroke events. For instance, the VM can be migrated to a dedicated VM-hosting server for long-term monitoring.

Although deception infrastructure 114 can attract the attention of some malware, there are instances of malware that are not willing or able to pay attention unless deception infrastructure 114 interacts with an account or OS that has not yet been infected or compromised. In some embodiments, therefore, an SUB is built to share a user account with a real user while preventing the real user from seeing or noticing bait information, unless the real user begins actively seeking unauthorized information through inappropriate techniques. For example, an SUB can be designed such that it is never logged in at the same time with the real user and such that it cleans up after itself after using the account, to prevent the real user from noticing its hidden activity.

Alternatively, an SUB can be designed to operate while the real user is logged in, but only running as background processes and acting in a manner that the real user cannot naturally notice. For example, the SUB can use an instance of a browser to surf the intranet, but only after the real user has started and minimized the instance: of course, the SUB can quickly return to the last page that the real user visited and delete the portion of the browser's history resulted from its clandestine activity, if the real user attempts to reactivate the browser.

At 208, flows of injected bait information is monitored. Bait information, or bait traffic, can be closely monitored in such manner that any artificially induced deviations can be easily detected. In some embodiments, pre-scripted traffic between decoy accounts within network 102 is monitored to detect any deviation from the script. For example, a set of dedicate machines, such as host systems 104, can run pre-scripted telnet traffic between the machines with passwords exposed in the clear. The script for the traffic is known and, therefore, if an attempt is made to add anything to the traffic, such attempt can be quickly detected.

In some embodiments, bait information stored statically under the control of a decoy account is monitored to detect any unscripted access to it. For example, bait e-mail messages exchanged between decoy accounts can be used to expose a name and location of a bait document seemingly containing confidential information to malware searching for particular keywords. Any subsequent attempt by the malware, or external system 110 in communication with the malware, to access the bait document can then be quickly detected.

In some embodiments, evidence indicative of unauthorized activities is collected and studied. For example, a deviation from the pre-scripted bait traffic, unscripted access to bait information, and/or various other suitable anomalous events collected, in some instances using different techniques, indicative of misconduct can be recorded and compared to one another. For instance, such anomalous events can be examined to determine whether they are correlated. Anomalous events determined to be correlated can then be combined to correctly identify a wrong doer or to reinforce the previous findings against the wrong doer.

Referring to FIG. 3, a method 300 transforms original information to bait information in accordance with some embodiments.

As shown, at 302, original information is translated. In some embodiments, a verbatim copy of recorded original data traffic and/or events of network 102 are used to create bait information. In some embodiments, automated tools are used to generate bait information from the recorded original data traffic and/or events by altering the content of the original information. For example, artifacts related to time delay can be removed from the original information before replaying them later. For instance, references to dates that are casually included in any of the many available formats can be removed or altered before being replayed. Any protocol-dependent address or DNS translation also can be removed.

In some embodiments, recorded system or network traffic and/or events are altered. For example, authentication credentials, such as a combination of a username and password can be altered. For instance, the original data flows or client-server interactions, such as a web-login and subsequent web page downloads, with altered username and password, can be used to uniquely identify the data flows or the client-server interactions and any eavesdropper. By cross-correlating subsequent exploitation attempts that use a different set of authentication credentials, the list of possible leaks can be narrowed, potentially, to a single system or device.

In some embodiments, the data content of the recorded traffic and/or events is altered. In some embodiments, the data content is altered to make the flow of the data more interesting or attractive to malware, such as a network sniffer, that is searching for, among other things, particular keywords. In some embodiments, the data content is altered to make it uniquely identifiable when it is transmitted over the network or if it appears on a different system (using e.g., forensic analysis). For example, dates, geographical locations, or person's name can be altered. In some embodiments, steganographic or watermarking techniques are used to embed identifying information in each data flow.

In some embodiments, the original information is further altered to generate more personalized bait information to make bait information more attractive to malware targeting specific organizations or having specific purposes. For example, malware designed to spy on the network of a government intelligence agency can be attracted to very different types of information in comparison with malware designed to spy on the corporate network of a business competitor.

For instance, many instances of attractive keywords, such as "top secret," "weapon system design," and "new defense strategy" can be inserted into the original information to generate bait information designed to attract malware spying on a military intelligence agency, whereas bait information containing key words such as "next mergers" or "acquisition strategy" or "new drug test results" can better attract malware spying on a corporate network.

In some embodiments, the translation is made through hard-coded rules. For example, an attractive phrase, such as "top secret," can be inserted into documents to make them more attractive targets. In some embodiments, the alteration is made with human inputs. For example, system or network administrators can specify sets of changes to previously recorded data to render the data safe to use. In some embodiments, a special environment, referred to as bait information creation environment (BICE), is made available for system administrators, or other authorized personnel, to craft a rich collection of deceptive information. For example, an officer of an intelligence agency can craft a rich collection of bogus information for use as decoys through BICE.

At 304, translated information is evaluated to determine the extent to which human readers can discern whether a set of messages is original information or bait information. In some embodiments, the translated information can be scrutinized by system administrators or intelligence officers to discover aspects, if any, that can potentially reveal that the information has been manipulated (i.e., translated) to be used as bait. For example, the translated information can be scored using, the fraction of bait messages that is incorrectly identified and/or the fraction of people incorrectly identifying a bait message as an original.

In some embodiments, a software tool is used to automate the evaluation of the translated message. For example, a program can be used to evaluate the translated message by recording the number of artifacts related to time delay that the translation has failed to remove.

At 306, the translation tool used at 302 is refined. Using the score obtained at 304, the translation tool that was used to translate the original information at 302 is further refined. For example, the rules that are used by the tool to remove the artifacts can be refined based on human reviews of bait information generated by the tools. In some embodiments, a publicly available corpus of messages, such as the ENRON corpus (i.e., a large set of email messages pertaining to the ENRON scandal and subsequent investigation) is used to further train the translation tool. For example, corpora of messages can be first translated using the translation tool.

Then the translated messages can be scored to determine the efficiency of the translation tool. Next, the translation tool can be tuned further based on the score. By repeating the steps many times, the translation tool can be further refined to generate more realistic bait information.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for generating bait information for trap-based defenses, comprising:

recording, using a hardware processor, data sent over a network;

replacing, using the hardware processor, a portion of the recorded data that includes personal information with altered personal information;

associating, using the hardware processor, the altered personal information with the recorded data as identifying information of the recorded data;

inserting, using the hardware processor, one or more keywords into the recorded data;

generating, using the hardware processor, bait information from the recorded data, wherein the bait information includes both the altered personal information and the one or more keywords inserted into the recorded data; and causing, using the hardware processor, the bait information, including both the altered personal information and the one or more keywords, to be sent over the network.

2. The method of claim 1, further comprising:

receiving, using the hardware processor, an evaluation of the bait information, wherein the evaluation is based on whether a user correctly identified that at least a portion of the data included in the bait information has the altered personal information or the one or more keywords.

3. The method of claim 1, wherein the data sent over the network comprises a set of in-host behaviors of at least one system in the network.

4. The method of claim 1, wherein the data sent over the network comprises at least one keystroke event.

5. The method of claim 1, further comprising:

monitoring, using the hardware processor, the bait information sent over the network using the associated altered personal information.

6. The method of claim 5, wherein causing the bait information to be sent over the network comprises using a surrogate user bot (SUB) using virtualized keyboard and mouse drivers to cause the bait information to be sent from a particular user account.

7. The method of claim 1, wherein the bait information comprises a bait email message having at least one document attached thereto.

8. A non-transitory computer-readable medium containing computer-executable instructions that, when executed by a processor, causes the processor to perform a method for generating bait information for trap-based defenses, the method comprising:

recording data sent over a network;

replacing a portion of the recorded data that includes personal information with altered personal information;

associating the altered personal information with the recorded data as identifying information of the recorded data;

inserting one or more keywords into the recorded data;

generating bait information from the recorded data, wherein the bait information includes both the altered personal information and the one or more keywords inserted into the recorded data; and causing, using the hardware processor, the bait information, including both the altered personal information and the one or more keywords, to be sent over the network.

9. The non-transitory computer-readable medium of claim 8, wherein the method further comprises:

receiving an evaluation of the bait information, wherein the evaluation is based on whether a user correctly identified that at least a portion of the data included in the bait information has the altered personal information or the one or more keywords.

10. The non-transitory computer-readable medium of claim 8, wherein the data sent over the network comprises a set of in-host behaviors of at least one system in the network.

11. The non-transitory computer-readable medium of claim 8, wherein the data sent over the network comprises at least one keystroke event.

12. The non-transitory computer-readable medium of claim 8, wherein the method further comprises monitoring the bait information sent over the network using the associated altered personal information.

13. The non-transitory computer-readable medium of claim 12, wherein causing the bait information to be sent over the network comprises using a surrogate user bot (SUB) using virtualized keyboard and mouse drivers to cause the bait information to be sent from a particular user account.

14. The non-transitory computer-readable medium of claim 8, wherein the bait information comprises a bait email message having at least one document attached thereto.

15. A system for generating bait information for trap-based defenses, the system comprising:

a hardware processor that is programmed to:

record data sent over a network;

replace a portion of the recorded data that includes personal information with altered personal information;

associate the altered personal information with the recorded data as identifying information of the recorded data;

insert one or more keywords into the recorded data;

generate bait information from the recorded data, wherein the bait information includes both the altered personal information and the one or more keywords inserted into the recorded data; and causing, using the hardware processor, the bait information, including both the altered personal information and the one or more keywords, to be sent over the network.

16. The system of claim 15, wherein the hardware processor is further programmed to:

receive an evaluation of the bait information, wherein the evaluation is based on whether a user correctly identified that at least a portion of the data included in the bait information has the altered personal information or the one or more keywords.

17. The system of claim 15, wherein the data sent over the network comprises a set of in-host behaviors of at least one system in the network.

18. The system of claim 15, wherein the data sent over the network comprises at least one keystroke event.

19. The system of claim 15, wherein the hardware processor is further programmed to:

monitor the bait information sent over the network using the associated altered personal information.

20. The system of claim 19, wherein the hardware processor is further programmed to cause the bait information to be sent over the network using a surrogate user bot (SUB) using virtualized keyboard and mouse drivers to cause the bait information to be sent from a particular user account.

21. The system of claim 15, wherein the bait information comprises a bait email message having at least one document attached thereto.

22. The method of claim 1, wherein the personal information comprises authentication credentials.

23. The non-transitory computer-readable medium of claim 8, wherein the personal information comprises authentication credentials.

24. The system of claim 15, wherein the personal information comprises authentication credentials.

* * * * *